(12) United States Patent
Hoebel et al.

(10) Patent No.: US 7,329,832 B2
(45) Date of Patent: Feb. 12, 2008

(54) AUTOMATED ADAPTIVE MACHINING OF OBSTRUCTED PASSAGES

(75) Inventors: Matthias Hoebel, Windisch (CH);
Bernd Fehrmann, Baden (CH);
Andreas Boegli, Vogelsang-Turgi (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/276,297

(22) Filed: Feb. 23, 2006

(65) Prior Publication Data

US 2006/0157456 A1 Jul. 20, 2006

Related U.S. Application Data

(63) Continuation of application No. PCT/EP2004/051801, filed on Aug. 16, 2004.

(30) Foreign Application Priority Data

Aug. 27, 2003 (EP) .................................. 03103232

(51) Int. Cl.
*B23K 26/38* (2006.01)
*B23K 26/03* (2006.01)
(52) U.S. Cl. .............................. 219/121.71; 219/121.83
(58) Field of Classification Search ............. 219/121.7, 219/121.71, 121.83; 382/141
See application file for complete search history.

(56) References Cited

U.S. PATENT DOCUMENTS

| | | | |
|---|---|---|---|
| 4,663,511 A * | 5/1987 | Tallman | 219/121.13 |
| 5,125,035 A * | 6/1992 | McCarthy et al. | 382/141 |
| 5,216,808 A | 6/1993 | Martus et al. | |
| 5,841,099 A * | 11/1998 | Owen et al. | 219/121.71 |
| 6,044,308 A | 3/2000 | Huissoon | |
| 6,380,512 B1 | 4/2002 | Emer | |
| 6,522,993 B1 * | 2/2003 | Tomko | 700/195 |
| 6,723,951 B1 * | 4/2004 | McGraw | 219/121.71 |
| 6,748,112 B1 * | 6/2004 | Nguyen et al. | 382/203 |
| 6,847,004 B2 * | 1/2005 | Das et al. | 219/121.71 |
| 2002/0076097 A1 | 6/2002 | Vaidyanathan | |
| 2003/0004606 A1 * | 1/2003 | Duffin | 700/193 |

(Continued)

FOREIGN PATENT DOCUMENTS

DE 4207169 A1 * 9/1993

(Continued)

OTHER PUBLICATIONS

European Search Report for EP Patent App. No. EP 03 10 3232 (May 26, 2004).

(Continued)

*Primary Examiner*—Geoffrey S. Evans
(74) *Attorney, Agent, or Firm*—Adam J. Cermak; Cermak Kenealy & Vaidya LLP

(57) ABSTRACT

An automated machining process for machining of an obstructed passage (5) of an article (1) includes the steps of deriving the position and orientation of the passage (5) from automated processing of images of the passage (5) and additional information from a distance measurement device and saving positions and orientations of the passage (5) as local coordinates with respect to a reference coordinate system attached to the material that surrounds the passage (5). The saved positions and orientations of the passage (5) are used for subsequent removal of unwanted material from the obstructed passage (5).

22 Claims, 2 Drawing Sheets

U.S. PATENT DOCUMENTS

2003/0142862 A1* 7/2003 Snow et al. ............... 382/154
2005/0067394 A1* 3/2005 Vaidyanathan et al. 219/121.83

FOREIGN PATENT DOCUMENTS

| EP | 0916445 | 5/1999 |
| EP | 1076106 | 2/2001 |
| EP | 1245691 | 10/2002 |
| EP | 1319632 | 5/2003 |
| GB | 2345455 | 7/2000 |
| WO | WO0232614 | 4/2002 |
| WO | WO02074482 | 9/2002 |

OTHER PUBLICATIONS

International Search Report for PCT Patent App. No. PCT/EP2004/051801 (Dec. 7, 2004).

* cited by examiner

AUTOMATED ADAPTIVE MACHINING OF OBSTRUCTED PASSAGES

This application is a Continuation of, and claims priority under 35 U.S.C. § 120 to, International application number PCT/EP2004/051801, filed 16 Aug. 2004, and claims priority to European application number 03103232.9, filed 27 Aug. 2003, the entireties of which are incorporated by reference herein.

BACKGROUND OF THE INVENTION

1. Field of the Invention

The invention relates to an automated machining process for machining of an obstructed passage of an article.

2. Brief Description of the Related Art

During the last decades the performance of gas turbine components has increased continuously. New, advanced materials have been introduced in order to comply with the high firing temperatures of modern engines. At the same time, component design has changed from not cooled, bulk components to hollow blades and vanes with a complex internal cooling structure. One of the latest developments is cooling channel configurations with a diffuser outlet, which typically has a fan shape geometry. In this design the diameter of the cylindrical section of the cooling channel defines the total airflow volume, whereas the fan shaped end of the channel results in an advantageous redistribution of the cooling air over the adjacent surface. According to the cooling requirements this film cooling effect can be adjusted by design variations of the diffuser outlet.

The latest generation of these gas turbine components has to withstand hot gas temperatures exceeding the melting point of highly alloyed, high-strength materials. In order to ensure safe and reliable operation of the engine, the designed functionality of the cooling system must be ensured during the whole lifetime of the hot gas path components. For this purpose protective coatings are applied to the outer (and sometimes also inner) surfaces of the parts.

In modern engines the number of cooling holes per component can be as high as several hundreds. The geometry of the cooling passages depends on their location on the component. It is not unusual that more than 20 different types of cooling holes can be found on a single component.

A typical manufacturing sequence of such a part starts with the casting. After the following machining a first metallic protection coating (usually of the MCrAlY family, where M is Ni and/or Co) is sprayed onto the component. A second, ceramic thermal barrier coating (TBC) is then deposited on the first coating. For most gas turbine components the thickness of either coating is in the range from 100 μm to 600 μm.

Cooling holes are only machined after both coatings have been deposited. The use of high power, pulsed lasers is common for this purpose. In most cases an initial start hole is created by percussion drilling, followed by a trepanning step that machines the precise contour of the cooling passage. This process is usually fully automated using expensive 5-axis CNC workcells equipped with a powerful Nd-YAG laser.

Problems arise when such a complex component returns after service. Gas turbine blades and vanes are normally designed for an overall lifetime of several 10000 operating hours. The protective coatings, however, are consumed earlier and have to be renewed several times during this period. This is in conflict with the requirement that the original airflow must be maintained.

Many attempts have been made in order to mask cooling holes and to avoid the deposition of coating powder in the cooling channels. Several techniques use masking material either in the form of UV curable material (U.S. Pat. No. 5,726,348, U.S. Pat. No. 6,265,022), epoxy, resin or organic material (EP-A2-1 245 691, EP-A1-1 076 106, U.S. Pat. No. 5,800,695), or fugitive plugs (U.S. Pat. No. 4,743,462). Often the masking material has to be applied in a time consuming manual process, e.g., with a syringe. A suitable etching or heat treatment can subsequently remove the masking material. However, these masking materials do normally not withstand the high temperatures that occur during the plasma deposition of the MCrAlY coating layer, where preheating temperatures exceed 700° C. followed by diffusion bonding heat treatment where temperatures rise above 1000° C. This is also the case for the fugitive plug approach as disclosed in U.S. Pat. No. 4,743,462 where the plug is made from plastic material that volatilizes at a temperature below that of the deposition process.

Due to the considerable number of different exit fan shapes and tolerances in original manufacturing, it is also not practicable to fabricate shadowing masks that could be applied from the outer surface of the part. It is thus desirable to establish a process which does not require any masking and that allows removal of overspray material in a precise and economic way.

The most straightforward method to achieve this goal is manual re-drilling of the partially plugged cooling holes. However, it is usually not easy to identify the precise location of the cooling channels in the oversprayed condition, as a part of the hole may be hidden under the renewed coating. Additionally, even for skilled operators it is not possible to re-contour the fan to the original shape in a reasonable time. As a consequence, the re-drilling operation becomes either prohibitively expensive and time-consuming, or the original cooling effect of the passage is modified in a unacceptable way.

U.S. Pat. No. 5,702,288 offers a solution to this problem. An abrasive slurry is forced through the cooling holes from the inside of the component thus removing residual overspray coating. However, this approach also abrades the other walls of the cooling channels and thus affects the overall performance of the cooling system.

Laser drilling offers an attractive solution for the manufacturing of cooling channels and it is thus evident to use this method for the redrilling process. A number of techniques have been patented for the laser machining of cooling holes in gas turbine components, e.g., U.S. Pat. No. 6,420,677, WO 02/32614, U.S. Pat. No. 6,359,254, U.S. Pat. No. 6,329,632, or U.S. Pat. No. 6,307,175. However, these methods do not provide a suitable solution for the repair process, where the component may have undergone dimensional changes during service. Repair of such parts requires accurately locating the new position of the cooling channel which is usually different from the original location. In addition, only the blocked part of the cooling hole has to be re-machined without causing damage to the back or side walls of the cooling channels. For this purpose the high pulse energies of conventional flash lamp pumped lasers, such as those cited in patents U.S. Pat. No. 6,420,677, WO 02/32614, U.S. Pat. No. 6,359,254, U.S. Pat. No. 6,329,632, or U.S. Pat. No. 6,307,175, are not suitable, because the energy input per pulse is too high and the volume affected by the laser pulse too big. On the other hand, if the pulse energy is reduced by external attenuation the small repetition rates of these conventional drilling lasers no longer allows an economic process.

The opening of substantially blocked cooling holes with an excimer laser operating in the UV has been disclosed in U.S. Pat. No. 5,216,808. The advantage of this type of laser is the high absorption of the UV wavelength in ceramic material such as TBC, which leads to effective material removal. It is claimed that due to the short pulse length and higher photon energy at the UV wavelength TBC is removed athermally by photo-ablation, resulting in negligible heat input into the material. However, this advantage is less pronounced for the metallic MCrAlY coating beneath the TBC layer. Furthermore, solid state lasers such as the Nd-YAG type are generally preferred by the industry for material processing due to their proven reliability and widespread use.

U.S. Pat. No. 6,172,331 and U.S. Pat. No. 6,054,673 give a suitable example of a solid state laser, which is capable of drilling both metallic and ceramic material. Here, a Nd-YAG laser is used in the q-switch mode, where short pulses of less than 500 ns duration are generated. In the q-switched mode the peak pulse power is high enough to remove the material mostly as vapor instead of melt ejection, which is common for conventional drilling. The energy per laser pulse is small and it is thus possible to detect hole breakthrough with a suitable device before significant damage to the wall behind the cooling hole occurs. Although the use of such a laser is desirable, it is not disclosed how the process can be advantageously applied for the repair of components that have undergone dimensional changes or where the cooling hole is only partially obstructed. Furthermore, the focus of these patents is the interruption of the drilling process directly after the detection of breakthrough (U.S. Pat. No. 6,054,673) and the additional use of a frequency multiplied component from the same laser which results in a shorter wavelength and thus higher absorption in metallic and ceramic material (U.S. Pat. No. 6,172,331). It is interesting to note, that U.S. Pat. No. 6,172,331 distinguishes the use of additional harmonic generation from the use of only the original wavelength. A process parameter window covering pulse peak powers from $10^5$ W to $10^7$ W is claimed. However, under certain conditions it is also possible to achieve evaporation of coating material with short pulses at smaller peak power $<10^5$ W, which is advantageous, because it reduces the power requirements for the laser source.

The modification and repair of film cooling holes in gas turbine components is described in U.S. Pat. No. 6,243,948, where the cooling hole outlets are enlarged and any portion which might exhibit cracks is removed. Although the inlet of these cooling channels is not modified and thus the total airflow change is very small, the enlargement of the outlets changes the film cooling effect and thus the performance of the component. No details are given about the hole detection or the machining step and how both can be carried out in a precise and economic way.

Such an automated method is suggested in U.S. Pat. No. 6,380,512, where a laser drilling process is disclosed to remove coating material from (partially) blocked cooling passages. The method relies on a 5-axes CNC workcell and a CNC component program with pre-programmed locations of the cooling holes. The drilling apparatus is equipped with a vision system and can thus compensate for component deformation or deviation from blueprint dimensions. The vision equipment is used to determine the actual location of the cooling holes either on the coated component or in a condition where the component is being prepared for coating. The apparatus is equipped with a flash lamp pumped Nd-YAG laser and the vision system is either mounted to the laser such that an image is obtained through the laser lens or it is separated from the laser. With this method it is also possible to remove the component from the fixture that was used for the original drilling, to modify (coat) it thereafter, followed by accurate repositioning and adjustment of the orientation of the component. However, the method only detects the position of the hole and not the orientation of the channel axis. For this reason only a partial compensation of component deformation and manufacturing tolerances is possible with the disclosed technique. Moreover, as the real orientations of the cooling channels are not detected, it is not possible to align the re-machined diffuser outlet accurately with the cylindrical section, which is left from the original drilling.

SUMMARY OF THE INVENTION

One aspect of the present invention includes providing an advanced method for a more advanced and powerful automated, adaptive machining method allowing to remove residual material from obstructed cooling passages.

An exemplary process according to the present invention is divided into a first step which comprises the detection of the obstructed passages and a second step which comprises a machining step for the removal of obstructing material, which can be carried out on the same or on separate workcells.

During the first inventive step a local reference co-ordinate system is created which uses characteristic features of the article such as corners or grooves. An automated scanning vision system is used to obtain actual 3D information of the position and orientations of the cooling passage. This detection process is fully automated and does not require the assistance of an operator. The position and orientation of the cooling passage are established with respect to a local reference co-ordinate system which can be precisely re-established at a later date. In this way, it is possible to make use of stored hole position and orientation data after intermediate machining steps, such as re-coating. As a particular example of the present invention, the hole position and orientation data is saved in a file that contains a unique identifier for the article.

In a second process step of the inventive method the data contained in this file is used for a precision machining operation, where residual material from a re-coating operation is removed from the cooling holes. In this way, a desired cooling flow rate and a favorable film distribution of the cooling medium can be re-established. Unwanted material could be overspray coating, other material plugging the cooling passages, recast from the original drilling or base material, if the intention is to enlarge a diffuser-end portion of the cooling passage. This is valid for a cooling passage of a turbine component which has a part with cylindrical cross section ending in a diffusor opening. Then, the part with the cylindrical section defines the total amount of cooling fluid that can be guided through the passage.

The position of each passage is a reference point that is obtained from the intersection of the channel axis with a local tangential surface plane. The local tangential plane can be established with any suitable measurement device, e.g., touch probes, eddy current sensors, optical triangulation sensors, conoscopic sensors, and/or interferometers.

The precision machining operation is either carried out on a dedicated machining workcell (CNC or robotic system) or on the same workcell that was originally used to acquire hole position and orientation data. Advantageously, a high power q-switched or precision drilling solid state laser or waterjet drilling is used for the precision machining operation, e.g., the removal of the unwanted material that prevents the desired flow of the cooling medium.

BRIEF DESCRIPTION OF THE DRAWINGS

Preferred embodiments of the invention are illustrated in the accompanying drawings, in which.

The drawings show only the parts important for the invention. Same elements will be numbered in the same way in different drawings.

DETAILED DESCRIPTION OF EXEMPLARY EMBODIMENTS

Figure 1:
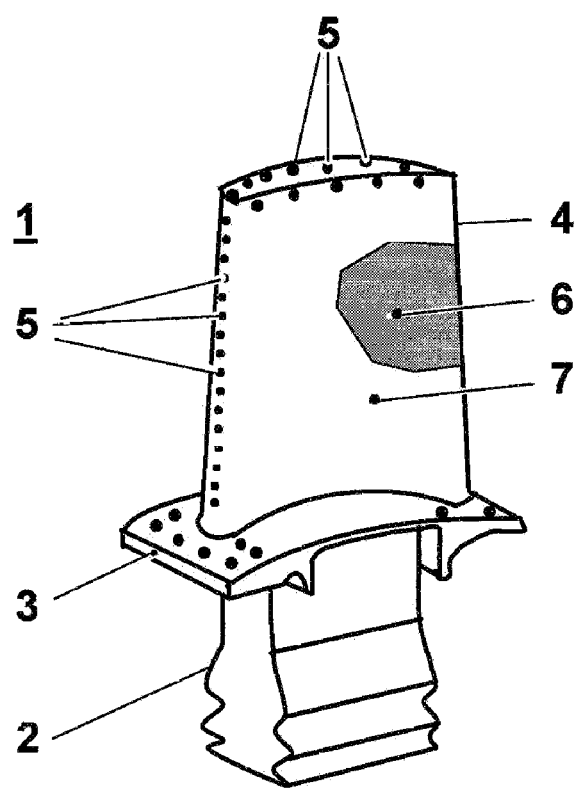
FIG. 1 illustrates a gas turbine blade as an example of an article, FIG. 2 a-c shows an oversprayed surface of the article and cross sections of the cooling hole before (FIG. 2b) and after (FIG. 2c) redrilling.

As an example FIG. 1 shows an article 1 such as blades or vanes of gas turbine engines, the gas turbine blade comprising a root portion 2, a platform 3 and a blade 4 and cooling holes 5. On the external surface 7 a MCrAlY-coating and/or a thermal barrier coating 6 is applied. The component can be made from a Nickel base superalloy known in the state of the art, e.g., from the documents U.S. Pat. No. 5,888,451, U.S. Pat No. 5,759,301 or from U.S. Pat. No. 4,643,782, which is known as "CMSX-4".

The process according to the present invention is divided into a first step which comprises the detection of the cooling passages 5 and a second step which comprises a machining step, which can be carried out on the same or on separate workcells.

After mounting the component in a fixture in the detection/vision workcell, a local reference co-ordinate system is established. It is important to note that characteristic features of the component itself are used for establishing this reference co-ordinate system. The characteristic features are chosen such that subsequent machining steps do not affect them. Example features are machined side surfaces, corners and rims, and/or or sealing groves. Using such fixed features for the determination of the local co-ordinate system, the component can be later put into another workcell, where it is possible to re-establish the same co-ordinate system. All hole locations and hole orientations are saved with respect to this local reference co-ordinate system. This is an important advantage as the local hole co-ordinates can be reused at any time without tedious alignment of the part. For instance, the local co-ordinates can be used for the re-opening of cooling holes 5 after the deposition of new protective coatings 6 with a thermal spray process. No sophisticated fixtures are required, as mounting misfit has no influence on the local co-ordinate system and on the local hole co-ordinates.

The workcell for the detection of cooling holes 5 is based on a robot equipped with a vision system and an optical sensor. In order to enhance the performance of the robot, absolute accuracy calibration techniques can be applied prior to the use of this system. The absolute accuracy calibration of the robot allows establishing a better cinematic model of the robot axes and results in improved accuracy. This enhanced performance is a crucial factor if flexible 6-arm robots are to be used for hole detection and/or precision machining. The following techniques are used for this purpose:

i) a so-called 'absolute calibration' is implemented. This calibration results in a more precise cinematic model of the robot and in enhanced accuracy, ii) an error-mapping table is established and used to compensate for residual deviations between position data indicated by the robot and the real, absolute position. The error-mapping table can be obtained with the help of a reference (master) component, which has been prepared with features that can be accurately measured. For instance, it is possible to fix mechanically drilled brass coupons onto the component's surface. The holes on these brass coupons can be accurately pinned and measured on a CMM (co-ordinate measurement machine), which is not possible for the original, laser-drilled holes. In this way, an error map can be established by comparing reference position data from the CMM with data from the hole detection workcell at positions of interest. With the error map it is then possible to apply position dependent corrections to the indicated positions and orientations.

Figure 3:
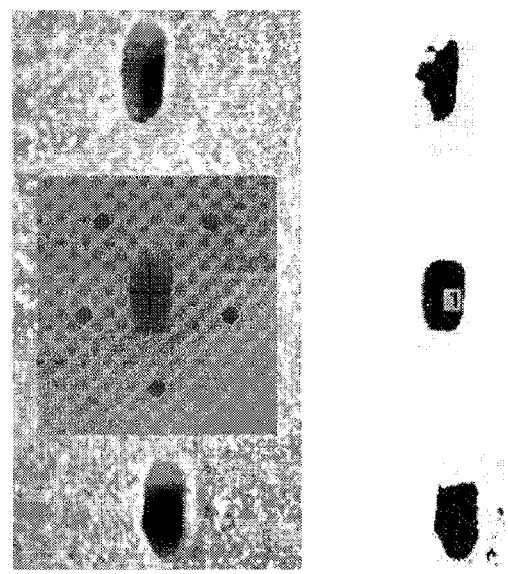
FIG. 3 shows a row of 3 cooling holes as seen by the vision system and FIG. 4 a, b illustrates the removal of a TBC overspray with high power q-switched Nd-YAG laser.
Figure 4:
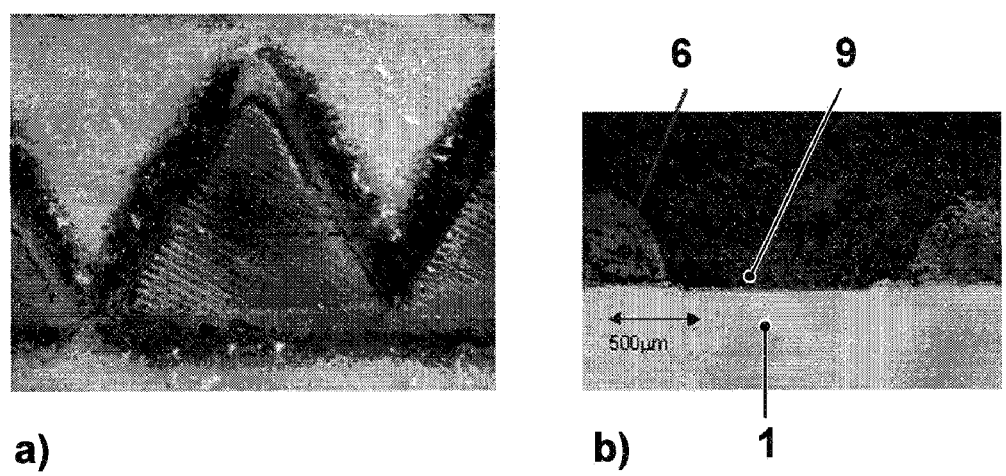

As seen in FIG. 3, the 3D position of each cooling channel is a reference point that is obtained from the intersection of the channel axis with a local tangential surface plane. The local tangential plane can be established with any suitable measurement device, e.g., touch probes, eddy current sensors, optical triangulation sensors, conoscopic sensors, and/or interferometers. A preferred solution makes use of an optical distance sensor. After a calibration of the sensor's tool centre point (TCP) it collects 3D-position information from the tangential surface that surrounds the cooling hole under inspection. A plane is then fitted through a suitable number of measurement points (e.g., 5 measurement points as seen in FIG. 3). Using information from original manufacturing (CAD data) the vision system is positioned in a start position which is close to the real location of the cooling hole. Images are taken at various angles and the optimum alignment with the cooling channels is derived from automated image processing using advanced image analysis tools. After alignment, the vision system automatically determines the centre of gravity of the cooling passage and positions the robot accordingly. The 3D-reference position of the cooling passage 5 is obtained from the intersection of the local tangential plane with the symmetry axis of the aligned vision system.

In a second process step the data contained in this file is used for a precision machining operation, where residual material from a re-coating operation is removed from the cooling holes 5. In this way, a desired cooling flow rate and a favorable film distribution of the cooling medium can be re-established. Unwanted material could be overspray coating 6, other material plugging the cooling passages, recast from the original drilling or base material, if the intention is to enlarge a diffuser-end portion of the cooling passage 5. An example is the machining of a cooling passage 5 which has a part with cylindrical cross section ending in a diffusor opening. Then, the part with the cylindrical section defines the total amount of cooling fluid that can be guided through the passage 5.

Due to the adoption of adaptive machining techniques and the use of on-line vision equipment the method compensates for component deformation that may have occurred during previous operation in the field. At the same time it takes tolerances of original manufacturing and deviations from original design geometry fully into account.

The precision machining operation is either carried out on a dedicated machining workcell (CNC or robotic system) or on the same workcell that was originally used to acquire hole position and orientation data. Advantageously, a high power q-switched or precision drilling solid state laser or waterjet drilling is used for the precision machining operation, e.g., the removal of the unwanted material that prevents the desired flow of the cooling medium.

The method offers an economical way of (re)-establishing a desired airflow rate and cooling air distribution. It is fully automated and combines a hole detection and subsequent precision machining step on two dedicated workcells.

Figure 2:
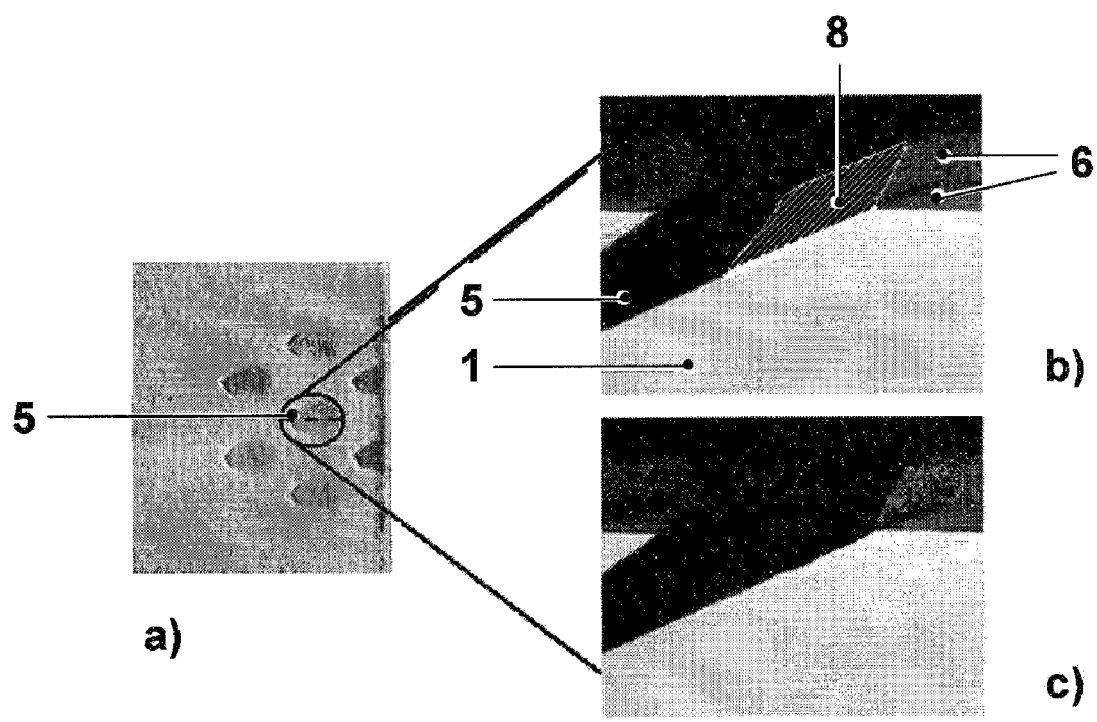

FIG. 2a-c show a typical overspray situation for a cooling hole 5 of the article 1 with a diffuser outlet that has been drilled at an angle of 30° to the surface. Overspray coating 6 has been deposited in a local area 8 onto the diffuser outlet of the hole 5. The picture below illustrates the situation for the same hole 5 before (FIG. 2b) and after removal (FIG. 2c) of the overspray coating 6.

Position information for all holes is saved in a component specific file with a unique identifier. After identification of the cooling hole positions, the component can be removed from the fixture for further machining steps such as re-coating. Removal of the overspray can be done on the same workcell that was used for hole detection. Alternatively, the precision machining uses a separate workcell dedicated for this purpose. In both cases the local co-ordinate system is re-established using the same unchanged characteristic features of the component as those used for previous determination of the local co-ordinate system. A CNC or robot program is then activated in order to position and move the component and laser beam relative to each other. This movement is made in a way that the original geometry can be reproduced by precision machining and any residual coating is removed from the cooling passage.

To determine the machined volume, the information from a conoscopic probe can be used without changing the orientation of the processing head. The information from the conoscopic probe can also be used to adapt the material removal strategy.

Advantageously the coating is taken off by local evaporation using a q-switched Nd-YAG laser. The laser beam is scanned over the surface of the cooling hole and the overspray is removed layer by layer. For an economic operation, the pulsed laser must be capable of producing intensities in the range from $2*10^7$ W/cm$^2$ to $5*10^8$ W/cm$^2$ at typical standoff distances of 150 mm-300 mm and at high repetition rates exceeding 10 kHz.

FIG. 5 shows an example for the removal of ceramic TBC overspray coating 6 from a test plate made from superalloy. Using 15 kHz laser pulses, a TBC coating 6 of approx. 450 µm thickness was removed in less than 10 s. Quick and accurate movement of the laser beam was achieved with the help of a galvano-scanner head. No damage occurred to the base material and the thickness of the recast layer 8 could be kept below 50 µm.

REFERENCE LIST

Article
Root portion
Platform
Blade
Cooling hole, cooling passage
Coating
External surface of article 1
Area
Recast layer While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A process for automated machining of an obstructed passage of an article, the process comprising:
   establishing a local reference coordinate system using characteristic features of the article that are unaffected by subsequent machining;
   obtaining over a plurality of angles thee-dimensional position and orientation data of the passage as local coordinates with respect to the reference coordinate system, using an automated scanning vision system and a distance measurement device;
   saving position and orientation data of the passage; and
   removing obstructing material from the passage using the saved position and orientation data of the passage.

2. A process according to claim 1 comprising:
   establishing a local tangential surface plane using a touch probe, an eddy current sensor, an optical triangulation sensor, a conoscopic sensor, an interferometer, an optical distance measurement device, or combinations thereof; and
   wherein obtaining comprises obtaining the position data of the passage from the intersection of the axis of the passage with the local tangential surface plane.

3. A process according to claim 1, wherein corners, rims, side surfaces, grooves, or combinations thereof, are used to establish the local reference coordinate system.

4. A process according to claim 1, wherein removing obstructing material comprises removing by laser evaporation using a high power Q-switched laser or precision drilling solid state laser.

5. A process according to claim 1, wherein removing obstructing material comprises removing with a Q-switched ND-YAG laser having a power intensity in the range from $2*10^7$ to $5*10^8$ W/cm$^2$.

6. A process according to claim 1, wherein removing obstructing material comprises removing by water jet drilling.

7. A process according to claim 1, wherein obtaining the position and orientation data of the passage comprises obtaining with a first robot or CNC-system, and removing obstructing material comprises removing with a second robot or CNC-system, different from the first robot or CNC-system.

8. A process according to claim 1, wherein obtaining the position and orientation data of the passage comprises obtaining with a first robot or CNC-system, and removing obstructing material comprises removing with said first robot or CNC-system.

9. A process according to claim 1, further comprising:
   establishing an error map using a reference article; and
   compensating for residual deviations between position data indicated by the robot and the actual, absolute position data.

10. A process according to claim 1, further comprising:
    deriving the orientation of the passage from the thee-dimensional position and orientation data of the passage; and
    determining the optimal alignment with the passage with image analysis tools.

11. A process according to claim 1, wherein the article is a superalloy turbine component having cooling passages, and further comprising:
  recoating the turbine component prior to said establishing a local reference coordinate system.

12. A process for automated machining of an obstructed passage of an article, the process comprising:
  establishing a local reference coordinate system using characteristic features of the article that are unaffected by subsequent machining;
  determining a local tangential surface using a distance measurement device;
  taking at a plurality of angles images of the obstructed passage using a scanning vision system and determining the passage axis using image analysis tools;
  obtaining position data from the intersection of the passage axis with the local tangential surface as local coordinates with respect to the reference coordinate system;
  saving position and passage axis data of the passage; and
  removing obstructing material from the passage using the saved position and axis data of the passage.

13. A process according to claim 12, wherein determining a local tangential surface comprises determining with a touch probe, an eddy current sensor, an optical triangulation sensor, a conoscopic sensor, an interferometer, an optical distance measurement device, or combinations thereof.

14. A process according to claim 12, wherein corners, rims, side surfaces, grooves, or combinations thereof, are used to establish the local reference coordinate system.

15. A process according to claim 12, wherein removing obstructing material comprises removing by laser evaporation using a high power Q-switched laser or precision drilling solid state laser.

16. A process according to claim 12, wherein removing obstructing material comprises removing with a Q-switched ND-YAG laser having a power intensity in the range from $2*10^7$ to $5*10^8$ W/cm$^2$.

17. A process according to claim 12, wherein removing obstructing material comprises removing by water jet drilling.

18. A process according to claim 12, wherein obtaining the position and determining axis data of the passage comprise obtaining with a first robot or CNC-system, and removing obstructing material comprises removing with a second robot or CNC-system different from the first robot or CNC-system.

19. A process according to claim 12, wherein obtaining the position and determining axis data of the passage comprise obtaining with a first robot or CNC-system, and removing obstructing material comprises removing with said first robot or CNC-system.

20. A process according to claim 12, further comprising:
  establishing an error map using a reference article; and
  compensating for residual deviations between position data indicated by the robot and the actual, absolute position data.

21. A process according to claim 12, further comprising:
  deriving the orientation of the passage from the axis and orientation data of the passage; and
  determining the optimal alignment with the passage with image analysis tools.

22. A process according to claim 12, wherein the article is a superalloy turbine component having cooling passages, and further comprising:
  recoating the turbine component prior to said establishing a local reference coordinate system.

* * * * *